United States Patent

Shacklett, III

[11] Patent Number: 5,952,122
[45] Date of Patent: Sep. 14, 1999

[54] BATTERY LABEL WITH PRIMER LAYER

[75] Inventor: James H. Shacklett, III, Ambler, Pa.

[73] Assignee: National Label Company, Lafayette Hill, Pa.

[21] Appl. No.: 09/040,162

[22] Filed: Mar. 17, 1998

Related U.S. Application Data

[63] Continuation of application No. 08/130,160, Sep. 29, 1993, abandoned, which is a continuation-in-part of application No. 07/743,840, Aug. 12, 1991, abandoned, which is a continuation of application No. 07/527,219, May 22, 1990, abandoned.

[51] Int. Cl.[6] .................................................. H01M 2/02
[52] U.S. Cl. ........................... 429/167; 428/344; 428/354
[58] Field of Search ..................................... 428/354, 344, 428/353; 429/164, 167

[56] References Cited

U.S. PATENT DOCUMENTS 4,801,514  1/1989  Will .
5,223,003  6/1993  Tucholski .

*Primary Examiner*—Jenna Davis
*Attorney, Agent, or Firm*—Reed Smith Shaw & McClay LLP

[57] ABSTRACT

A multi-layer label for a dry-cell battery having at least one layer of plastic, at least one layer of adhesive and at least one layer of primer, wherein the primer layer and adhesive layer both lie either between a plastic layer and the battery body or between two plastic layers, and wherein no reaction harmful to said label's function or appearance takes place between the chemicals of said primer layer and those of said adhesive layer.

11 Claims, 3 Drawing Sheets

BATTERY LABEL WITH PRIMER LAYER

This application is a continuation of application Ser. No. 08/130,160 filed on Sep. 29, 1993, abandoned, which is a continuation in part of application Ser. No. 07/743,840, filed Aug. 12, 1991, now abandoned, which is a continuation of application Ser. No. 07/527,219, filed May 22, 1990, now abandoned.

BACKGROUND OF THE INVENTION

"Primary" batteries are those that, once discharged, are not readily capable of being recharged, and as a result, are discarded. Early primary batteries used liquid electrolytes for power and were not very portable. As technology advanced, a "dry" process for combining energy-generating compounds was developed which allowed for greater battery portability. These primary batteries became known as "dry cell" batteries.

A cross-sectional diagram of a typical ready-to-use consumer dry cell battery of the prior art is provided in FIG. 8. The energy generating components of that battery are encased within a metal canister, referred to as the battery wall, battery can, or battery cell. The battery can itself is typically encased in a battery cover. Such battery covers can serve three functions. First, they may insulate or otherwise protect the materials contained in the battery cell from the outer environment. Second, they may protect the consumer and the product into which the battery is placed from battery leakage. Third, they provide a surface for affixing a labelling image or other decoration identifying the product.

Until recently, most battery makers typically enclosed battery cans in "metal jacket" battery covers, with a protective fiberboard layer of insulation between the metal jacket and the battery can to prevent shorting. The labelling image in a metal jacket cover is imprinted on the jacket. Battery manufacturers that still use metal jacket covers typically contract with independent sources for the supply of such covers. These battery manufacturers typically apply the metal jacket covers and insulating fiberboard to the battery cans in the final stage of the battery manufacturing process.

Metal jacket battery covers suffer from two principal drawbacks. First, the metal casing of the cover is relatively thick (up to 3/64th of an inch) especially when combined with the insulating fiberboard layer. Within the limits of each battery size, the cover thickness limits the volume available to store chemical compounds within the battery can. Since battery life is a function of both the type and amount of compounds used, use of these relatively thick metal jacket covers leads to reduced battery life. Second, metal jacket covers allow a relatively high incidence of battery can leakage wherein inner substances leak through both the battery can and the metal jacket cover. Such leakage may result in battery short circuits, thereby terminating this battery's life. Additionally, this leakage may cause outwardly visible discoloration and corrosion, which, though relatively harmless to a battery from a functional standpoint, can seriously erode consumer confidence in a battery manufacturer's product.

Alternative battery cover systems were developed and made possible by technological breakthroughs in applications for polyvinyl chloride, or "PVC". PVC is a clear, plastic material which can meet or exceed the durability, flexibility, and strength characteristics of a metal jacket with much less thickness of material. In PVC-based battery covers, one or more very thin layers of PVC film replace both the metal jacket and fiberboard insulating layer of the traditional metal jacket cover. Typically, a hard grade of PVC film is employed in such constructions, and this material may be referred to as "HPVC". Since PVC-based covers are considerably thinner than their metal jacket counterparts, they allow for much more dry cell material to be included in an enlarged battery cell, and thus allow for relatively longer-lived batteries. Other positive characteristics of PVC, including its strength, flexibility, and durability, allow PVC-based battery covers to perform the leak-prevention and insulation functions of battery covers better than metal jacket battery covers. Finally, PVC is a superior medium over the metal jacket for the printing of battery label information and decoration. For alkaline batteries, the combination of alkaline cell material and the larger cell size (achieved through use of the thinner PVC battery covers) leads to a dramatic increase in battery life. As a result, alkaline battery manufacturers have rapidly adopted the new PVC-based battery cover technology.

Pressure-sensitive PVC battery covers are flat covers, sometimes referred to as "labels", for ready-to-use consumer dry-cell batteries. Typically, pressure sensitive PVC battery labels have the following characteristics: (1) one or more layers of PVC film designed to allow for shrinkage in only the hoop (circumferential) direction when applied to the battery body, (2) printed label information and other decoration, (3) a layer of metal, typically vapor-deposited aluminum, (4) a layer of adhesive material which allows the label to adhere to the battery body, and (5) a backer or liner which is removed just before the label is applied by the battery manufacturer. Pressure sensitive battery labels are normally sized so that the label is fractionally longer than the battery can at both ends. In applying these labels to batteries, the labels are initially removed from their backer and wrapped around the battery can. Next, the wrapped battery passes through a small heating unit where the ends of the label are heated, causing the label to shrink circumferentially (in the hoop direction) at its ends where it extends beyond the battery body. This shrinkage causes the label to wrap tightly around the ends of the battery can, forming a tight protective seal.

Pressure sensitive PVC labels can be arranged in a number of different configurations depending on, among other factors, the number of PVC layers used. Labels composed of a single layer of PVC are known as monofilm labels, those formed of two layers of PVC are known as duplex labels, and labels composed of three layers of PVC are known as triplex labels. As mentioned above, these labels typically include a thin metal layer, which gives the label a bright background and an overall appearance superior and brighter than that achievable through printing of metallic inks alone. Depending on the position of the metal layer relative to the PVC, the labels are further classified. For example, a metal-down duplex label has two layers of PVC with a metal layer disposed between the bottom (or innermost) layer of PVC and the battery body. Similarly, in a metal-up duplex label the metal layer lies between the two PVC layers. The position of the metal layer and the number of PVC layers used in a given application depend on the battery cell involved as well as battery-manufacturer preference.

In order to facilitate the application of the metal layer to the PVC and adherence of the metal to the plastic film, metalization primers have been employed between the metal layer and the PVC film. Primer layers have also been used in other locations within the label to enhance printing. For example, one such triplex label having a primer layer between the metal layer and PVC is shown in Ast, Adhesive Labeling—Suitable Especially For Plastics, *Packung & Transport,* Vol. 1, 1984. That triplex label has the following layers (from bottom to top): (1) backing, (2) silicone, (3) adhesive, (4) HPVC, (5) primer, (6) metal, (7) adhesive, (8) HPVC, (9) imprint, (10) adhesive, and (11) HPVC. The primer layer of this label (layer 5) and an adhesive layer (layer 7) are sandwiched between two layers of HPVC layers 4 and 8).

The prior art recognizes the undesirability of having layers of primer and adhesive oriented between layers of film. The specific drawbacks of this arrangement include optical as well as functional defects. The optical defects often appear in the imprint on the labels and in the form of folds after the labels are applied. Noted functional defects include non-uniform shrinkage of the labels after application to the battery bodies, peeling off of the label at the point of overlap, and delamination of the various layers of the composite label.

SUMMARY OF THE INVENTION

The present invention is particularly suited to the manufacture of metal-up-type battery labels where primers are typically employed. By minimizing or eliminating interactions between residual adhesive solvents and metalization primer, the problems previously associated with labels containing both primer and adhesive are avoided. More specifically, the primer of the present invention is directly applied to a metalization layer which has been applied to a plastic layer. The primer effectively seals the upper surface of the metal layer and simultaneously fills in the voids and interstices between the vapor deposited metal particles, bonding directly to the underlying PVC layer through the voids and interstices.

Where low viscosity primers/sealers (formed from either acrylic or polyester materials) are employed in connection with adhesive on a multi-layer PVC label, no detectable bubbling or buckling results. Moreover, an imprint layer may be printed directly on the primer/sealer. In addition, where such primers/sealers are employed, there is no increase in dull areas within the metalization. The application of metalization primer/sealer results in a brighter surface than tat achievable using direct metalization of PVC films, as well as providing enhanced metal-to-plastic adhesion. The primer/sealer layer may be applied through a variety of standard coating techniques including spraying, offset gravure coating, direct gravure coating or "analux" coating techniques. When using a gravure method, the primer should be applied a fine screen having a hundred lines or better per inch.

Additionally, because the primer/sealer layer of the present invention utilizes a substantially aqueous polar vehicle, one designing a primered multilayer label need not concern himself with the venting of residual solvents. According to the present invention, a primer layer and an adhesive layer may be sandwiched between two layers of PVC, or between a layer of PVC and the battery body, where such venting may not be possible, and no deficiencies in the label will result.

Polypropylene and polyester films are also well suited for use in the instant invention as they are readily obtainable, easily handled and possess the desired shrinkability and stretchability characteristics.

DETAILED DESCRIPTION OF THE INVENTION

Figure 1:
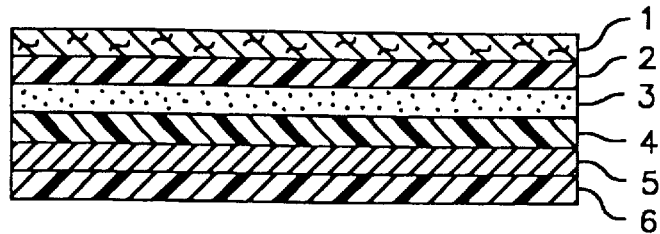
FIG. 1 shows a cross-sectional view of a monofilm label according to the present invention.

Referring to FIG. 1, there is shown one embodiment of a monofilm battery label made according to the present invention having a bottom adhesive layer 3, primer layer 4, metal layer 5 and a bottom plastic layer 6. The layers are ordered so that bottom adhesive layer 3 lies closer to the battery body than metal layer 5 when the label is affixed to a battery body. Prior to its application on a battery body, the monofilm label of FIG. 1 may be detachably arranged on a backing 1 having adhesive repellent layer 2. Typically, adhesive repellent layer 2 will be formed of silicone. Preferably, bottom plastic layer 6 is typically formed of polyvinyl chloride (PVC) or hard polyvinyl chloride (HPVC) film. Bottom plastic layer 6 may also be formed from other plastic films or foils including those which are shrinkable or stretchable, but is more preferably of non-shrinkable plastic films. Metal layer 5 may be composed of aluminum and is preferably vapor deposited on bottom plastic layer 6. Conventional pressure sensitive and laminating adhesives well known in the art may be employed.

Figure 2:
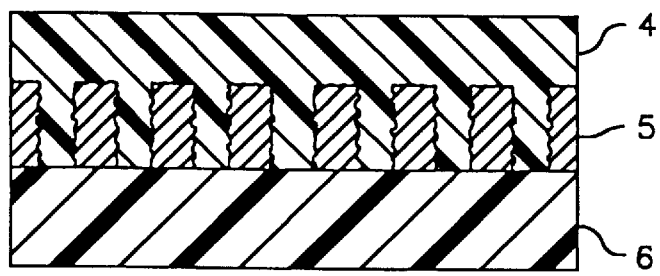
FIG. 2 is a pictoral representation of the outermost three layers of the battery label shown in FIG. 1 viewed in exaggerated detail.

In the embodiment shown, metal layer 5 is applied directly to bottom layer 6. Under such conditions, although it appears that the vapor deposited metallic layer is uniformly applied to the underlying plastic layer, numerous voids and interstices exist between the metallic particles. These voids and interstices extend downwardly to the upper surface of the underlying plastic layer. As shown in FIG. 2, the vapor deposited metallic layer 5 adheres to bottom plastic layer 6. The bond which adheres the vapor deposited metal to the plastic layer is traditionally the weakest link in terms of battery label lamination strength. The voids and interstices between the metallic particles show that the surface which appears smooth and uniform to the unaided eye is uneven and, more importantly, unsuited to accept any layer, especially an imprint layer. Primer layer 4 is applied above the metallic layer and fills in the voids and interstices. Significantly, primer layer 4 also provides an additional bond between the metallic layer and the bottom plastic layer. In this regard, the primers of the present invention not only provide a sealant to the surface of the metallic layer but also provide a smooth, integral surface onto which an imprint or adhesive or other such layer may be directly applied. It will be therefore appreciated that the primer is not merely a surface preparation, but also prevents oxidation of the metallized layer and is a sealant to air and moisture.

In one embodiment of the present invention, the primer sealer is a water-based primer formulation, and is preferably a butyl acrylate, formulation typically containing propanol, ammonium hydroxide, butyl benzyl phthalate, zinc oxide and ammonium carbonate. The primer is dissolved in a substantially aqueous/polar dispersant containing from 75 to 95% water and 25% to 5% propanol, and is applied to a surface of a plastic layer at a solids content of from 5 to 25% solids and more preferably from 15 to 20% (measured by press viscosity).

Figure 3:
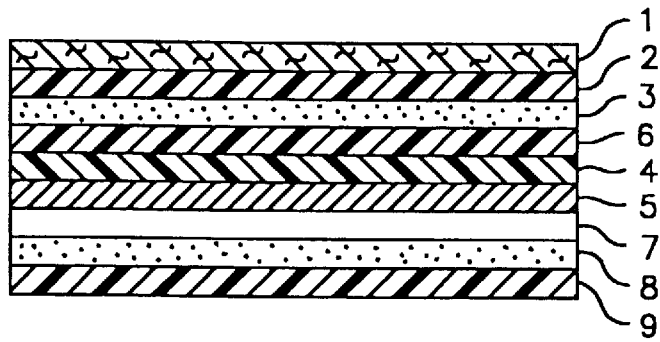
FIG. 3 shows a cross-sectional view of an alternative embodiment of a metal-up duplex label according to the present invention.

Referring to FIG. 3, there is shown a metal-up duplex label according to the present invention. Primer layer 4 and metal layer 5 here lie above bottom plastic layer 6. Above metal layer 5 is imprint 7. On top of imprint 7 is top plastic layer 9 having top adhesive layer 8 on its underside. Top plastic layer 9 may be formed of the same materials as bottom plastic layer 6. Preferably, imprint 7 is outwardly visible and metal layer 5 provides the label with an outwardly visible metallic appearance which contrasts on the outside of the label with imprint 7.

Figure 4:
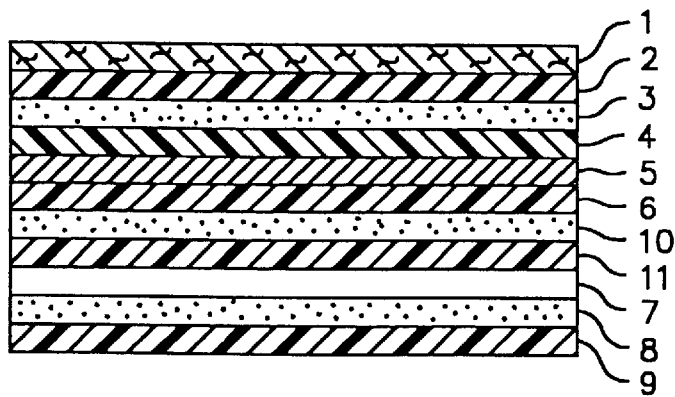
FIG. 4 shows a cross-sectional view of a triplex label according to the present invention.

Referring to FIG. 4, there is shown a triplex label according to the present invention. The triplex label of FIG. 4 has the same base layers 1–6 as the label of FIG. 1, and is provided with five additional outer layers. On top of bottom plastic layer 6 there lies intermediate plastic layer 11 having intermediate adhesive layer 10 on its underside. On top of intermediate plastic layer 11 lies imprint 7. Top plastic layer 9, having top adhesive layer 8 on its underside, lies on top of imprint 7. Intermediate plastic layer 11 may be formed from the same types of materials as bottom plastic layer 6 and top plastic layer 9.

Figure 5:
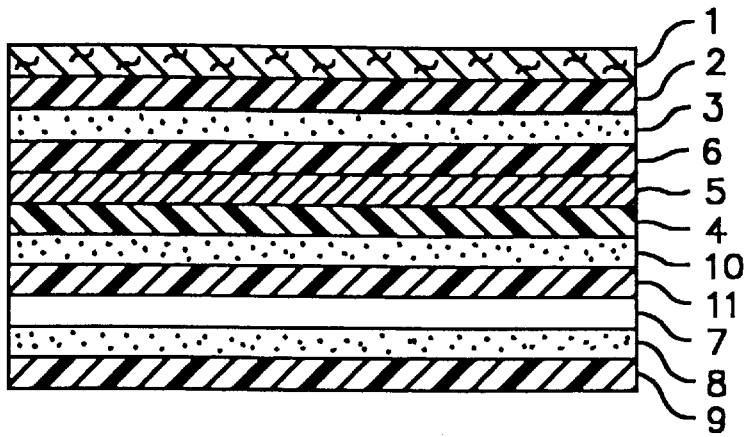
FIG. 5 shows a cross-sectional view of a first alternative triple label according to the present invention.

Referring to FIG. 5, there is shown an alternate embodiment of a triplex label according to the present invention. In FIG. 4, metal layer 5 was disposed between the battery body and bottom plastic layer 6. In contrast, the label of FIG. 5 has metal layer 5 disposed between bottom plastic layer 6 and intermediate plastic layer 11. In this embodiment, primer layer 4 lies between and metal layer 5 and intermediate adhesive layer 10.

Figure 6:
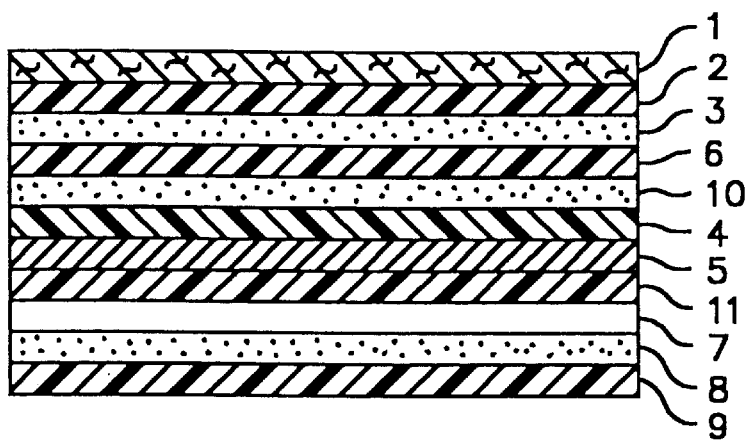
FIG. 6 shows a cross-sectional view of a second alternative triplex label according to the present invention.

Referring to FIG. 6, there is shown a further alternative embodiment of a triplex label according to the present invention. Like the label in FIG. 5, the label of FIG. 6 has metal layer 5 disposed between bottom plastic layer 6 and. In FIG. 6, however, primer layer 4 lies between intermediate plastic layer 11 and metal layer 5 and intermediate adhesive layer 10.

Figure 7:
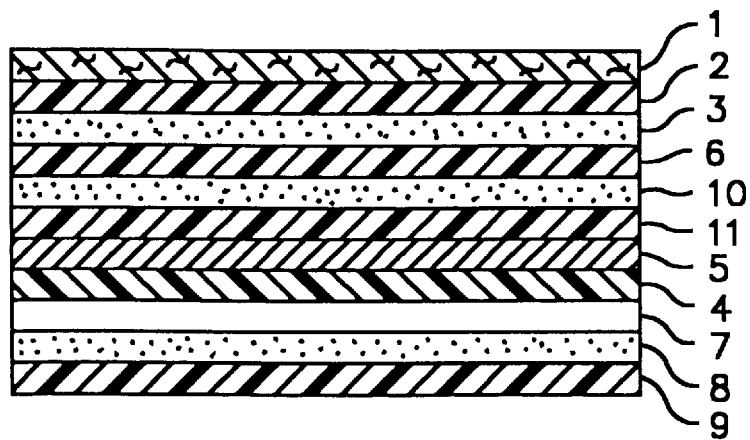
FIG. 7 shows a cross-sectional view of a third alternative triplex label according to the present invention.
Figure 8:
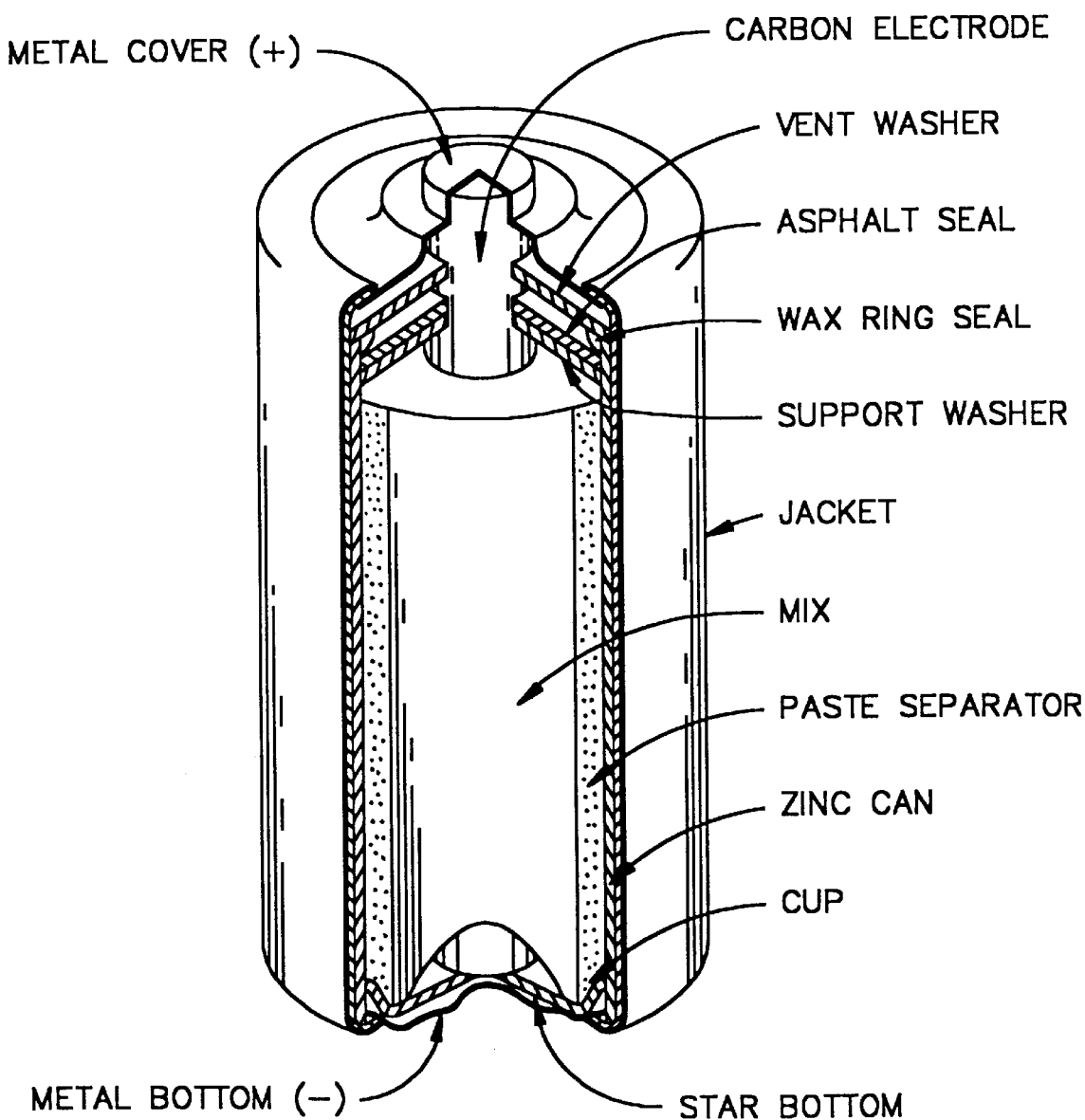
FIG. 8 shows a cross-sectional view of a ready to use consumer dry-cell battery of the prior art.

Referring to FIG. 7, there is shown a still further alternative embodiment of a triplex 30 label according to the present invention. In this embodiment, metal layer 5 is disposed between intermediate plastic layer 11 and top plastic layer 9 and a primer layer 4 lies between the metal layer 5 and a top adhesive layer 8.

In any of the illustrated embodiments, the metalization primer layer may be formed by application of a curable liquid material, such as other plastic monomers, lacquers, or similar material, in a thin and uniform layer to a plastic film. Among the materials useful as primers are acrylic and polyester film-forming liquids which have been thinned to an appropriate solids content. Application of these materials in amounts of from approximately 0.05 to 0.25 gm per square meter is generally sufficient to assure coverage and uniformity of the primer layer. Such application results in a stronger bond between the metalization layer and the plastic layer to which it is applied, and this enhanced bond results in a more durable and higher quality label than heretofore achieved.

The present invention may be embodied in other specific forms without departing from the spirit or essential attributes of the invention. Accordingly, reference should be made to the appended claims, rather than to the foregoing specification, as indicating the scope of the invention.

STATEMENT OF INDUSTRIAL UTILITY

The present invention may be used in the construction of a convention "dry cell" type consumer battery in order to provide a thin, decorative, leak-resistant, insulating covering for the battery body.

What is claimed is:

1. An article comprising a multi-layered battery label adhered to the circumferential surface of a generally cylindrical battery body, the label comprising:

(A) a shrinkable plastic film layer;

(B) a metallic layer applied and bonded directly to said plastic film layer, said metallic layer being formed by vapor deposition whereby said layer has voids and interstices therein extending to said plastic film; and (C) a primer layer directly overlying said metallic layer, said primer layer comprising a low viscosity curable liquid dispersion of film-forming liquid, portions of said primer layer contacting said plastic film layer in said voids and interstices to provide an additional bond between said metallic layer and said plastic film layer.

2. An article in accordance with claim 1, wherein said primer layer comprises a film-forming liquid selected from the group consisting of acrylics and polyesters and wherein said primer is applied in the amount of about 0.05 to 0.25 grams per square meter of said plastic film layer.

3. An article in accordance with claim 1, and an imprint layer is applied to said primer layer.

4. An article in accordance with claim 3, wherein said primer is applied in the amount of about 0.05 to 0.25 grams per square meter of said plastic film layer.

5. An article in accordance with claim 1, and an adhesive layer for adhering the label to the battery, said adhesive layer being applied to one of said plastic film layer and said primer layer.

6. An article in accordance with claim 5, wherein said adhesive layer comprises pressure sensitive material.

7. An article in accordance with claim 5, wherein said adhesive layer is applied to said plastic film layer, and an imprint layer is applied to said primer layer.

8. An article in accordance with claim 1, wherein said plastic film layer is polyester.

9. An article in accordance with claim 1, wherein said plastic film layer is polyvinyl chloride.

10. An article comprising a multi-layered battery label disposed on the circumferential surface of a battery body, comprising a shrinkable first plastic film layer, a second plastic film layer, a metallic layer, a primer layer and an adhesive layer, said first plastic layer being disposed between said second plastic layer and said battery body, said metallic layer being formed by vapor deposition and applied and bonded directly to one of said film layers, said metallic layer having voids and interstices therein extending to said plastic film, said primer layer directly overlying said metallic layer and comprising a low viscosity aqueous dispersion of curable film-forming liquid, portions of said primer contacting said plastic film layer in said voids and interstices to provide an additional bond between said metallic layer and the film layer on which said metallic layer is deposited.

11. An article in accordance with claim 10, wherein said primer layer comprises a film-forming liquid selected from the group comprising acrylics and polyesters and wherein said primer is applied in the amount of about 0.05 to 0.25 grams per square meter of plastic film layer.

* * * * *